United States Patent [19]
Schuster et al.

[11] Patent Number: 5,831,632
[45] Date of Patent: Nov. 3, 1998

[54] AUTOMATIC GRAPHICAL PATTERN PLACEMENT

[75] Inventors: Michael D. Schuster, Redwood City; John E. Warnock, Los Altos, both of Calif.

[73] Assignee: Adobe Systems Incorporated, San Jose, Calif.

[21] Appl. No.: 580,472

[22] Filed: Dec. 28, 1995

[51] Int. Cl.$^6$ .................................................. G06F 15/00
[52] U.S. Cl. ............................................................ 345/441
[58] Field of Search ................................... 395/141, 142, 395/143; 345/441, 442, 443, 440, 433, 436, 438

[56] References Cited

U.S. PATENT DOCUMENTS 4,975,860  12/1990  Kitaya et al. ............................ 264/520
5,459,820  10/1995  Schroeder et al. ...................... 395/120

FOREIGN PATENT DOCUMENTS 0 698 863 A2  2/1996  European Pat. Off. .

OTHER PUBLICATIONS

Warnock et al. (1988) "PostScript Prints Anything: A Case History,." *I.E.E.E. Spectrum* 25(5):42–46.

Rangel–Mondragon et al. (1988) "Computer Generation of Penrose Tilings," *Computer Graphics Forum* 7:29–37.

Hsu, Siu Chi and Lee, Irene "Drawing and Animation Using Skeletal Stokes", Computer Graphics Proceedings, Annual Conference Series (SIGGRAPH 94 Conference Proceedings Jul. 24–29, 1994), 1994.

Adobe Illustrator User Guide, Macintosh Version 3.0, pp. 41–68, 243–263, Adobe Systems Incorporated, 1990.

*Primary Examiner*—Phu K. Nguyen
*Attorney, Agent, or Firm*—Fish & Richardson P.C.

[57] ABSTRACT

A graphical pattern placement technique automatically performed by a computer whereby lying in a single plane a path on an electronic document is provided and a graphical pattern is selected. Then, the graphical pattern is automatically placed along the path by a programmed computer such that the graphical pattern follows the orientation and curvature of the path.

30 Claims, 10 Drawing Sheets

AUTOMATIC GRAPHICAL PATTERN PLACEMENT

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to graphical pattern placement, and more particularly, to automatic graphical pattern placement on an electronic document.

2. Description of the Related Art

In modern drawing programs, such as Adobe Illustrator® produced by Adobe Systems, Inc. of Mountain View, Calif., graphical patterns are made available to a user. The user is able to select an appropriate graphical pattern for a drawing the user is creating, and then manually place individual copies of the selected graphical pattern wherever desired on the drawing being created. For example, the user may desire to place a border around a drawing. The creation of the border would require the user to select a graphical pattern and then individually place multiple copies of the pattern around the periphery of the drawing.

A major problem with this conventional approach is that it requires a great deal of user time to individually place the graphical patterns so as to form the border or other shape. Another problem with the conventional approach is that when the graphical pattern is to be placed on a curved line or around a corner, the user has great difficulty in getting the border to follow the curve or corner in a graphically pleasing manner. Although the user can usually modify the individual graphical patterns being placed to fix the curved line or corner, the modification of individual graphical patterns is difficult and very time consuming.

Thus, there is a need for improved techniques for placing graphical patterns along borders or other shapes such that graphically pleasing borders or shapes can be produced with only a minimal amount of user time.

SUMMARY OF THE INVENTION

Broadly speaking, the invention relates to a graphical pattern placement technique performed automatically by a computer. Initially, a path on an electronic document is provided and a graphical pattern is selected. Then, the graphical pattern is automatically placed along the path by a programmed computer such that the graphical pattern follows the orientation and curvature of the path. The invention can be implemented in numerous ways, including as a system, a method, or as a computer readable medium.

As a system for placing a graphical pattern around a path, an embodiment of the invention includes: a computer system for executing computer code to produce and display an electronic document having a graphical pattern placed around a path, a display device for displaying the electronic document, and a computer readable storage medium for storing the computer code. The computer code including computer instructions for selecting or drawing a path on an electronic document, computer instructions for selecting a graphical pattern, and computer instructions for automatically and repetitively placing instances of the graphical pattern along the path.

As a computer-implemented method for placing a graphical pattern around a path, an embodiment of the invention performs the operations of: providing a path on an electronic document, selecting a graphical pattern, and automatically and repetitively placing instances of the graphical pattern along the path. In addition, prior to placing the graphical patterns along the path, the method may adjust the size of the graphical pattern and/or the path so that a multiple number of pattern cells exactly fit along at least a portion of the path. The method may further perform the operation of modifying, prior to placing the graphical patterns along the path, each instance of the graphical pattern to the orientation and curvature of a position along the path where the instance is to be placed.

As a computer-implemented method for forming a graphical image in an electronic document using a graphical pattern, another embodiment of the invention performs the operations of: providing a path on the electronic document, dividing the path into corner regions and side regions, adjusting the size of at least one of the graphical pattern and the path for each of the side regions so that an integer number of graphical patterns exactly fit along each of the side regions, modifying the shape of the graphical pattern to fit each of the corner regions of the path, and placing the graphical pattern along the path.

As a computer readable medium containing program instructions for placing a graphical pattern around a path on an electronic document, an embodiment of the invention comprises: computer readable code devices for providing a path on an electronic document, computer readable code devices for selecting a graphical pattern, and computer readable code devices for automatically and repetitively placing instances of the graphical pattern along the path. The computer readable code devices for placing may include computer readable code devices for adjusting the size of the graphical pattern and/or the path so that a multiple number of pattern cells exactly fit along at least a portion of the path. The computer readable medium may also include computer code devices for modifying each instance of the graphical pattern to the orientation and curvature of a position along the path where the instance is to be placed.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to the drawings. However, those skilled in the art will readily appreciate that the detailed description given herein with respect to these figures is for explanatory purposes as the invention extends beyond these limited embodiments.

Figure 1:
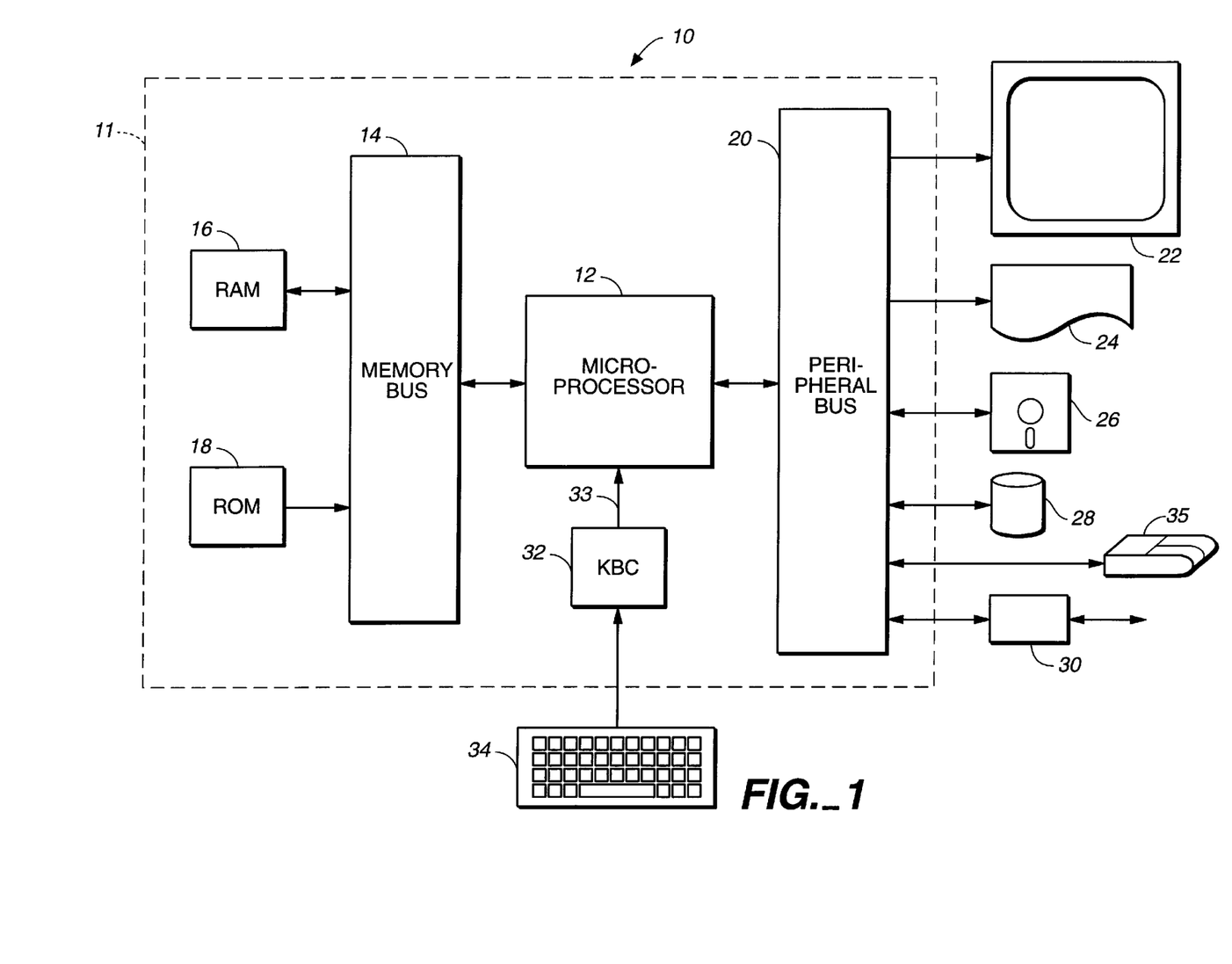
FIG. 1 is a block diagram of an exemplary computer system for automatically placing graphical patterns in accordance with the invention.

FIG. 1 is a block diagram of an exemplary computer system 10 for automatically placing graphical patterns in accordance with the invention. The computer system 10 includes a digital computer 11, a display screen (or monitor) 22, a printer 24, a floppy disk drive 26, a hard disk drive 28, a network interface 30, a keyboard 34, and a mouse (pointing device) 35. The digital computer 11 includes a microprocessor 12, a memory bus 14, random access memory (RAM) 16, read only memory (ROM) 18, a peripheral bus 20, and a keyboard controller 32. The digital computer 11 can be a personal computer (such as an IBM compatible personal computer), a workstation computer (such as a SUN or Hewlett-Packard workstation), or some other type of computer.

The microprocessor 12 is a general purpose digital processor which controls the operation of the computer system 10. The microprocessor 12 can be a single-chip processor or can be implemented with multiple components. Using instructions retrieved from memory, the microprocessor 12 controls the reception and manipulation of input data and the output and display of data on output devices. In the described embodiment, a function of microprocessor 12 is to automatically place graphical patterns along a path within an electronic document. Preferably, this function is part of a drawing application program which is executed by the microprocessor 12.

The memory bus 14 is used by the microprocessor 12 to access the RAM 16 and the ROM 18. The RAM 16 is used by the microprocessor 12 as a general storage area and as scratch-pad memory, and can also be used to store input data and processed data. For example, input data from a file of a drawing or other electronic document can be in the form of Adobe Illustrator® program file format, Portable Document Format (PDF), or the like. If the input data also contains text regions, PostScript® or other page description language character codes may be used to represent the characters. The ROM 18 can be used to store instructions followed by the microprocessor 12 as well as image descriptions used to display images in a specific format.

The peripheral bus 20 is used to access the input, output, and storage devices used by the digital computer 11. In the described embodiment, these devices include the display screen 22, the printer device 24, the floppy disk drive 26, the hard disk drive 28, and the network interface 30. The keyboard controller 32 is used to receive input from keyboard 34 and send decoded symbols for each pressed key to the microprocessor 12 over bus 33.

The display screen 22 is an output device that displays images of data provided by the microprocessor 12 via the peripheral bus 20 or provided by other components in the computer system 10. In the described embodiment, the display screen 22 is a raster device which displays images on a screen corresponding to bits of a bitmap in rows and columns of pixels. That is, a bitmap can be input to the display screen 22 and the bits of the bitmap can be displayed as pixels. An input bitmap can be directly displayed on the display screen 22, or components of computer system 10 can first render codes or other image descriptions from a page description file into bitmaps and send those bitmaps to be displayed on the display screen 22. Raster display screens such as CRT's, LCD displays, etc. are suitable for use as the display screen 22.

The printer device 24 provides an image of a bitmap on a sheet of paper or a similar surface. The printer 24 can be a laser printer, which, like display screen 22, is a raster device that displays pixels derived from bitmaps. The printer device 24 can also print images derived from coded data such as found in a page description language file. Other output devices such as a plotter, typesetter, etc. can be used in place of or in addition to the printer device 24.

The floppy disk drive 26 and the hard disk drive 28 can be used to store electronic documents, bitmaps and image descriptions as well as other types of data. The floppy disk drive 26 facilitates transporting such data to other computer systems, and hard disk drive 28 permits fast access to large amounts of stored data such as bitmaps, which tend to require large amounts of storage space.

The microprocessor 12 together with an operating system (not shown) operate to execute computer code and produce and use data. The computer code and data may reside on the RAM 16, the ROM 18, or the hard disk drive 28. The computer code and data could also reside on a removable program medium and loaded or installed onto the computer system 10 when needed. Removable program mediums include, for example, CD-ROMs, PC-CARDs, floppy disks and magnetic tapes.

The network interface 30 is used to send and receive data over a network connected to other computer systems. An interface card or similar device and appropriate software implemented by the microprocessor 12 can be used to connect the computer system 10 to an existing network and transfer data according to standard protocols.

The keyboard 34 is used by a user to input commands and other instructions to the computer system 10. Images displayed on the display screen 22 or accessible to the computer system 10 can be edited, searched, or otherwise manipulated by the user by inputting instructions on the keyboard 34. The mouse 35 is also connected to the computer system 10 to likewise input commands and other instructions to the computer system 10. Typically, the mouse 35 or other pointing devices operate by manipulating a pointer on the display screen 22. Other types of user input devices can also be used in conjunction with the present invention. For example, a track ball, a stylus, or a tablet can be used as is well known in the art.

Figure 2:
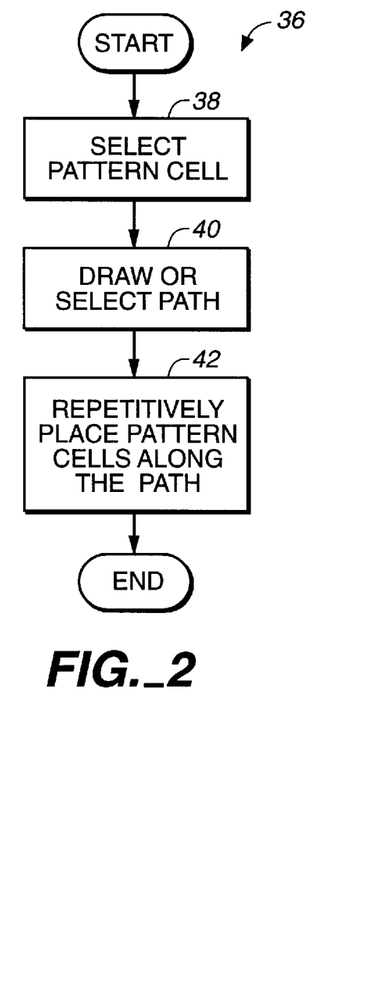
FIG. 2 is a flow diagram of a graphical placement technique according to a basic embodiment of the invention.

FIG. 2 is a flow diagram of a graphical pattern placement technique 36 according to a basic embodiment of the invention. The graphical pattern placement technique 36 initially selects 38 a pattern cell. The pattern cell is a graphical pattern that is to be placed on an electronic document. Next, a path is drawn or selected 40. Typically, the user will draw the path on the electronic document. However, if an appropriate path already exists within the drawing, then the user can alternatively select the path. Thereafter, the pattern cells are repetitively placed 42 along the path. The placement of the pattern cells along the path is performed automatically by a computer system performing operations described in more detail below. As the pattern cells are placed 42 along the path, the individual pattern cells are bent or otherwise modified as they are placed so that the pattern cells follow the path. Hence, as a result of the invention, the pattern cells which are automatically placed 42 along a path follow the path in a graphically pleasing manner. Also, because the placement of the pattern cells along the path is automatic, the user no longer has to endure the time consuming manual operation required to place the pattern cells along the path.

Figure 3:
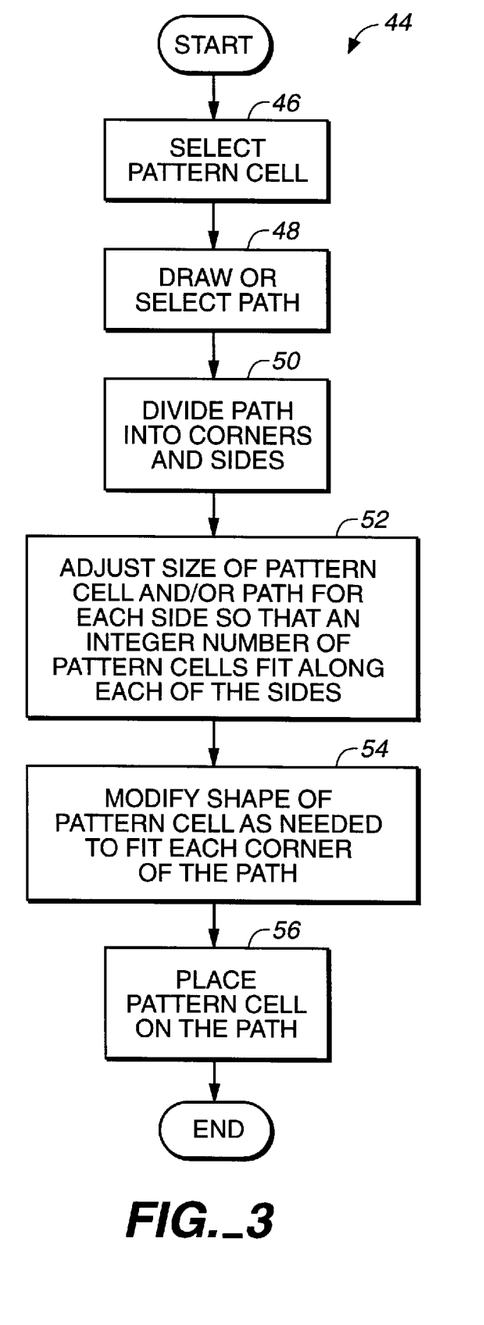
FIG. 3 is a flow diagram of a graphical placement technique according to a first embodiment of the invention.

FIG. 3 is a flow diagram of a graphical placement technique 44 according to a first embodiment of the invention. Preferably, the graphical pattern placement technique 44 is implemented by a computer system such as the computer system 10 illustrated in FIG. 1.

The graphical pattern placement technique 44 initially selects 46 a pattern cell. referably, a user would select the pattern cell from a multitude of pattern cells made available to the user. Next, the user would select or draw 48 a path on an electronic document. Typically, the user will draw 48 the path on the electronic document. However, if an appropriate path already exists within the drawing, then the user can alternatively select 48 the path. The electronic document is the document to which the pattern cells are to be placed. Preferably, at least a portion of the electronic document represents an image, and the pattern cells are eventually placed in the electronic document as part of the image. The path is then divided 50 into corners and sides. Corners are associated with abrupt changes in direction of the path, whereas sides are either straight or curved portions of the path. Depending on the shape of the path, the path may not have any corners or may have many corners. The path will always include at least one side.

Next, the graphical pattern placement technique 44 adjusts 52 the size of the pattern cell and/or path for each side so that an integer number of pattern cells fit along each of the sides. Normally, the pattern cell will initially have a predetermined size. Hence, the graphical pattern placement technique 44 compares the size or length of a side of the path with the predetermined size of the pattern cell. Then, either the size or length of the side or the predetermined size of the pattern cell is adjusted 52 so that an integer number of the pattern cells fit along each of the sides. Of course, both the size and length could be adjusted 52. Such adjustments are made for each of the sides of the path. The manner of adjustment can depend on the user's preferences. For example, the user may desire that the path be adjusted because small changes in its size are not important. Alternatively, the user may desire that the pattern cell itself be stretched or shrunk so that an integer number of the pattern cells fit along each of the sides. Yet another alternative is to effectively (but not actually) make the size of the pattern cell larger or smaller be adding equal amounts of space (e.g., white space) between each of the pattern cells placed along a side, thus an integer number of the patterns cells fit along the side. Generally, the selection from the above alternatives is usually dependent on the user's desires and the particular type of pattern cell being utilized.

Next, the shape of the pattern cell is modified 54 as needed to fit each corner of the path. Preferably, the pattern cell will have at least one corner format as well as a side format. The corner format is designed to be placed at corners of the path. However, the corner format is designed for a 90° corner. Hence, corners that differ from 90° require modification 54 to the shape of the pattern cell. The modification 54 to the shape of the pattern cell is generally associated with bending the shape of the corner format to fit the non-square corner. The modification to the shape of the corner format of the pattern cell for the corners is discussed in detail below with reference to FIGS. 6A–6C.

Thereafter, the adjusted and modified pattern cells are placed 56 on the path. The adjusted and modified pattern cells are either placed 56 adjacent to one another or with a space between the adjusted and modified pattern cells.

Figure 4A:
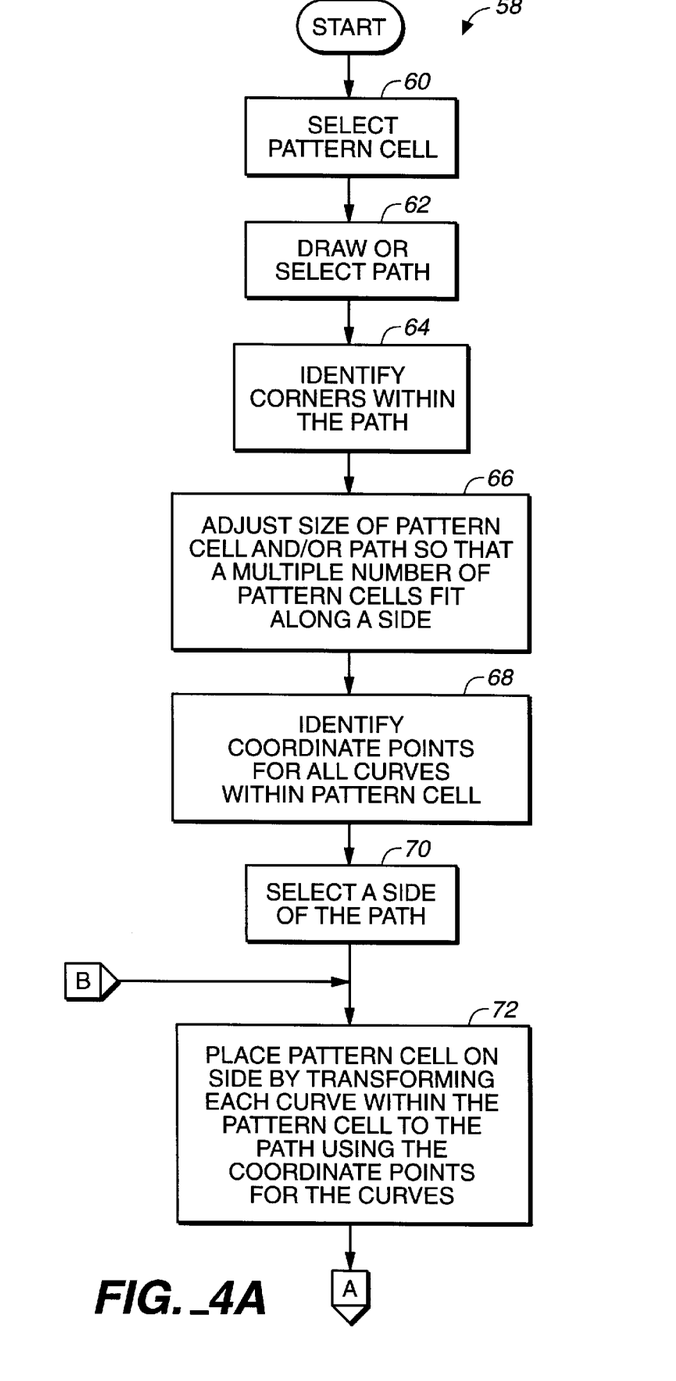
FIGS. 4A–4C are flow diagrams of a graphical placement technique according to a second embodiment of the invention.
Figure 4B:
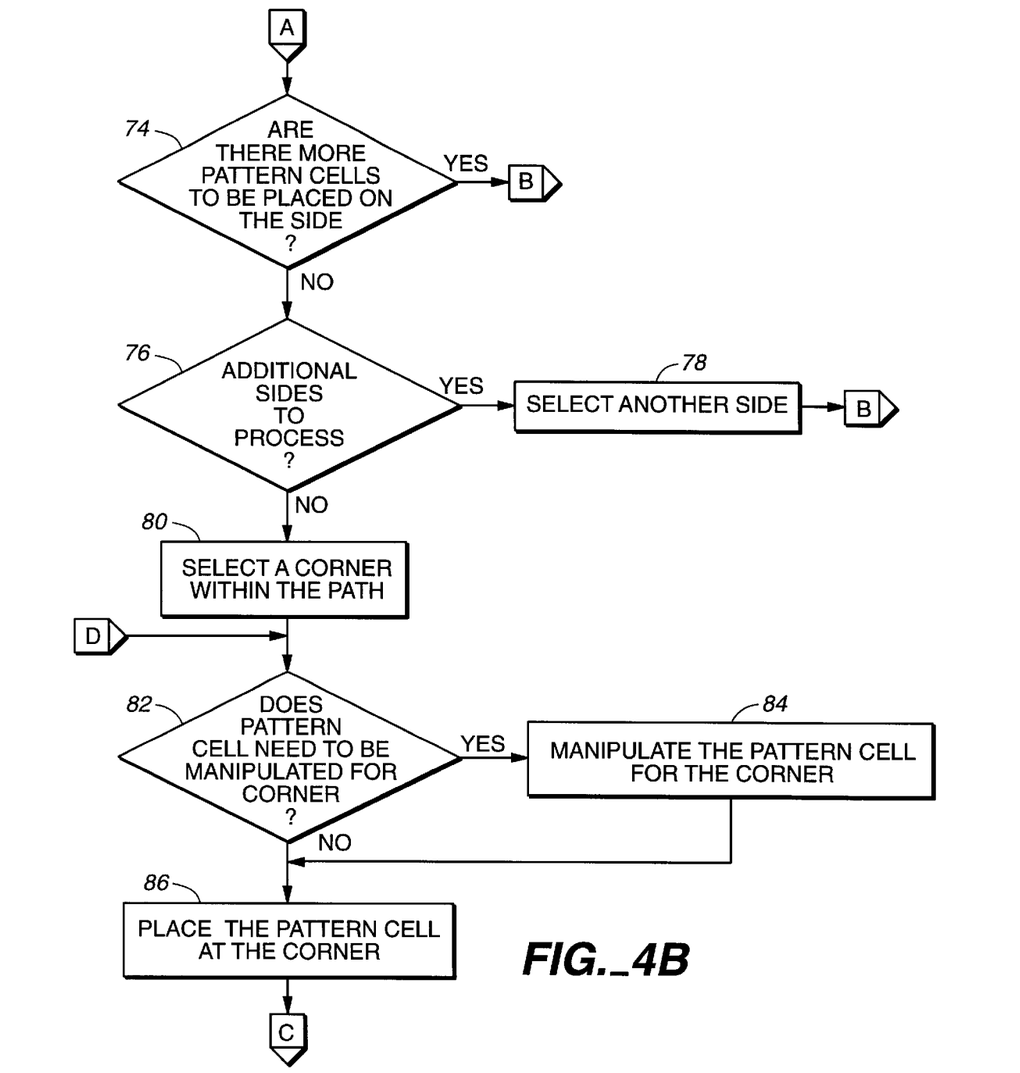
Figure 4C:
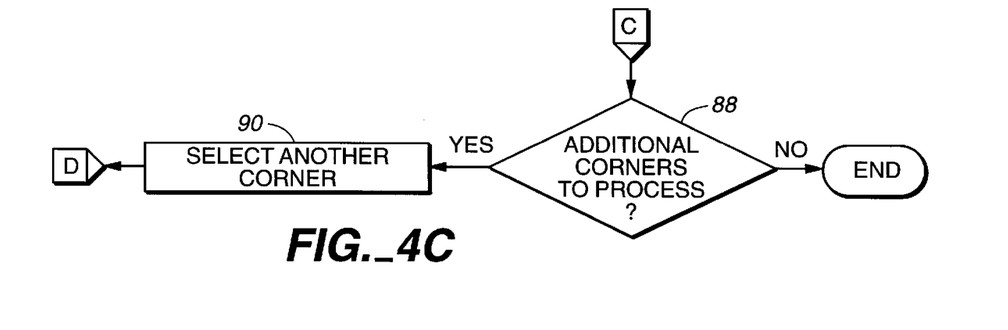

FIGS. 4A–4C are flow diagrams of a graphical placement technique 58 according to a second embodiment of the invention. Examples of pattern cells, paths and patterns produced by the second embodiment of the invention are illustrated in FIGS. 7, 8, 9A, 9B, 9C, 9D, 10A, 10B, 11A and 11B. Preferably, the graphical pattern placement technique 58 is implemented by a computer system such as the computer system 10 as illustrated in FIG. 1.

Figure 7:
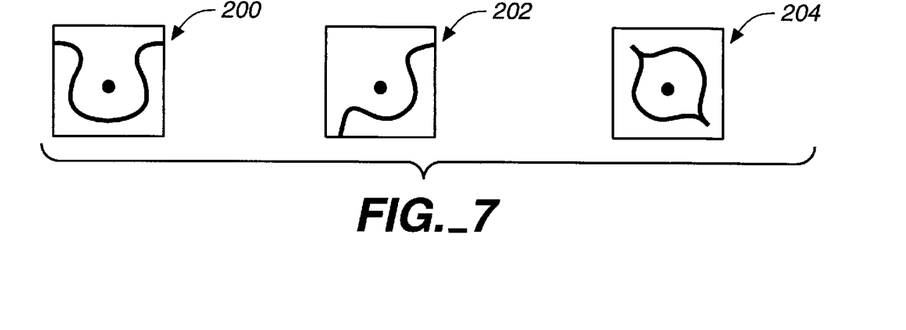
FIGS. 7, 8, 9A, 9B, 9C, 9D, 10A and 10B are examples of pattern cells, paths and patterns produced by the invention.

Initially, the graphical pattern placement technique 58 selects 60 a pattern cell. The pattern cell is a graphical pattern of a predetermined size. Normally, a user would select the pattern cell from a multitude of previously defined pattern cells made available to the user. Alternatively, the selection of the pattern cell could actually involve the user constructing (e.g., drawing) the pattern cell. In any case, FIG. 7 illustrates an exemplary pattern cell for use with the invention. The pattern cell illustrated in FIG. 7 preferably has a side format 200, an inner corner format 202 and an outer corner format 204. Other less complicated cell patterns may only have or require a single format for the pattern cell.

Figure 8:
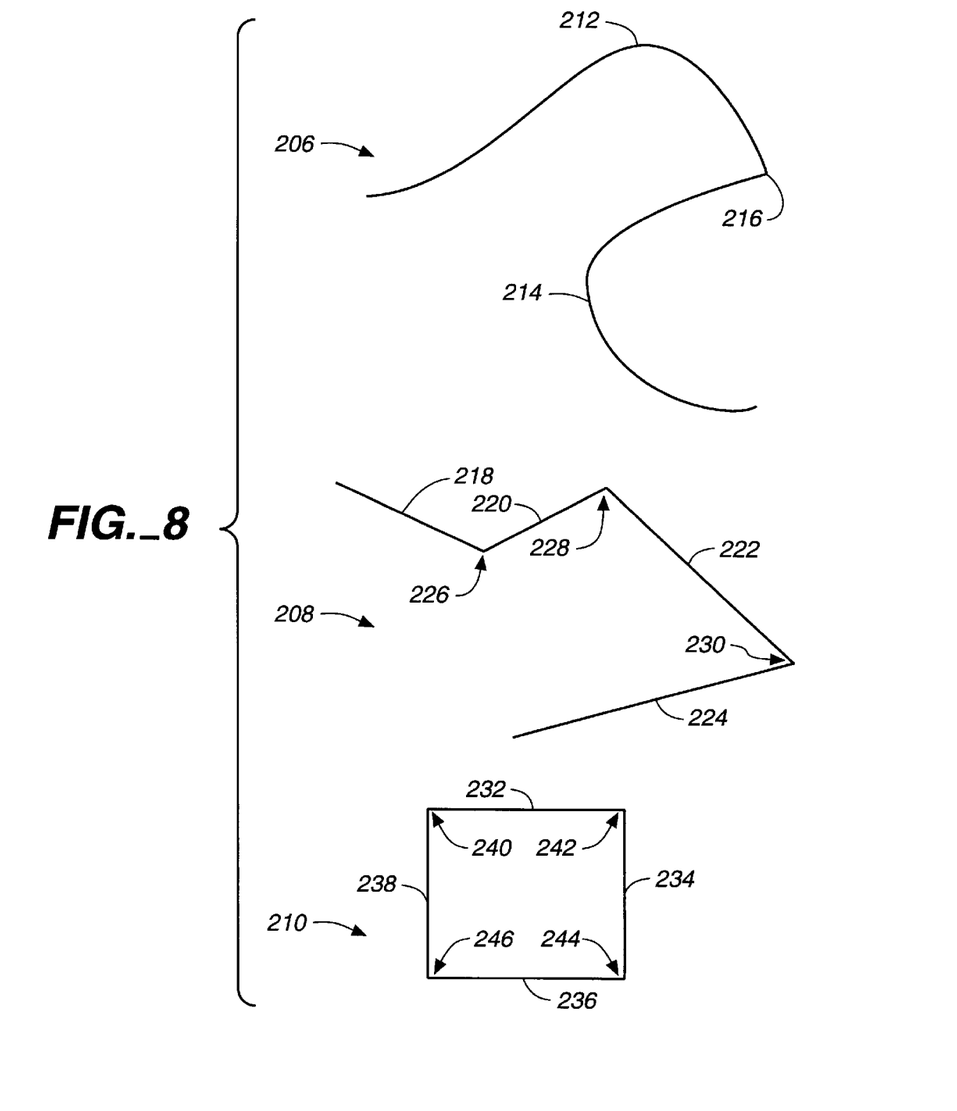

Then, a user draws or selects 62 a path upon an electronic document which the selected pattern cell is to be placed. Typically, the user will draw 62 the path on the electronic document. However, if an appropriate path already exists within the drawing, then the user can alternatively select 62 the path. The path may have any shape. The path, however, will generally include corners and sides. In this embodiment, it is assumed that the path includes at least one corner and at least one side. Corners are associated with abrupt changes in direction of the path, and sides are associated with straight or curved regions of the path. The electronic document is the document to which the pattern cells are to be placed. Preferably, the electronic document represents an image or drawing, and the drawn or selected path is part of the image or drawing. FIG. 8 illustrates exemplary paths 206, 208 and 210 which may be drawn or selected by the user. The exemplary path 206 has two sides 212 and 214 separated by a corner 216. The exemplary path 208 has four sides 218, 220, 222 and 224 separated by corners 226, 228 and 230. The exemplary path 210 has four sides 232, 234, 236 and 238 separated by four corners 240, 242, 244 and 246.

Figure 9A:
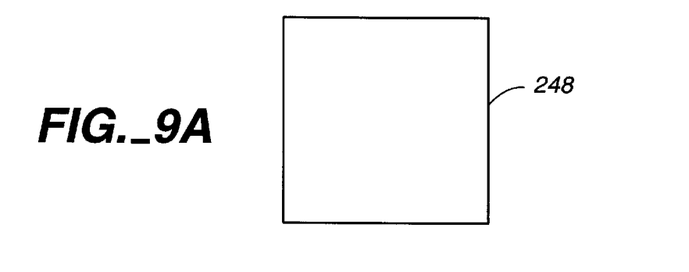
Figure 9B:
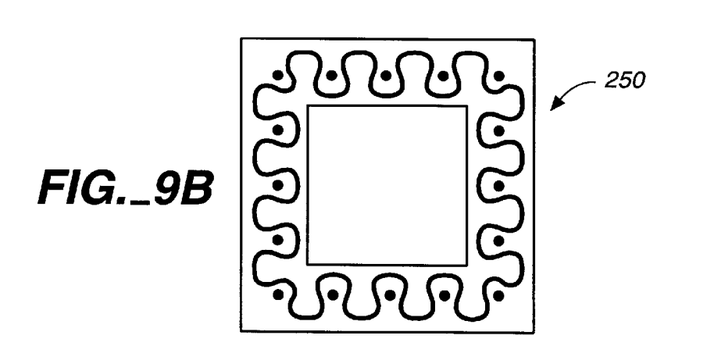

Next, the size of the pattern cell and/or path is adjusted 66 so that a multiple number of pattern cells fit along a side. Here, the adjustment 66 is individually determined for each side of the path. The manner of adjustment 66 can depend on the user's preferences. For example, the user may desire that the pattern cell itself be stretched or shrunk so that an integer number of the pattern cells fit along each of the sides. FIGS. 9A and 9B illustrate an example of this situation. FIG. 9A illustrates a path 248 around which the pattern cell shown in FIG. 7 is to be placed. Because the width of the path 248 is slightly more than the width of three adjacent pattern cells, the width of the (three) pattern cells that are to be placed along the sides of the path 248 corresponding to the width have their width reduced slightly so that three of the pattern cells exactly fix along the width of the path 248. Also, in this example, the width of three adjacent cell patterns exactly fits along the height of the path 248 so that no adjustment would be required for the sides of the path 248 corresponding to the height. FIG. 9B illustrates a pattern 250 that is subsequently formed using the path 248, the adjusted pattern cell, and the unadjusted pattern cell. Although not visually apparent, the width of the pattern cells placed along the sides of the path 248 corresponding to the width have been slightly reduced from their predetermined width (FIG. 7).

Figure 9C:
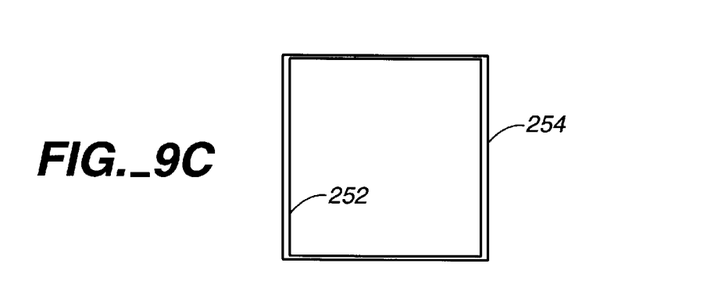
Figure 9D:
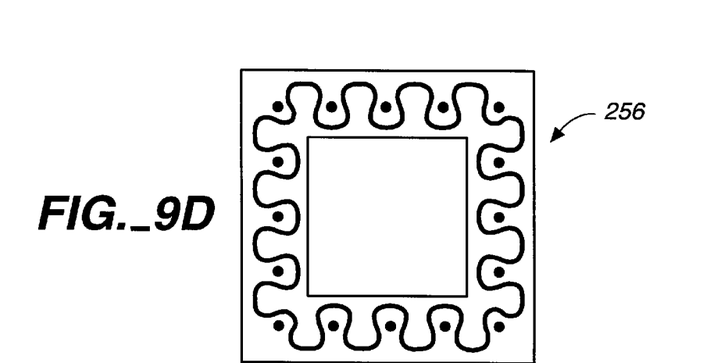

Alternatively, the user may desire that the path be adjusted because small changes in its size are not important. FIGS. 9C and 9D illustrate an example of this situation. Here, the height and width of an original path 252 are slightly enlarged so that three adjacent pattern cells exactly fit along the sides, thus forming an enlarged path 254. FIG. 9B illustrates a pattern 256 that is subsequently formed using the enlarged path 254 and the adjusted pattern cells.

Yet another alternative is to effectively (but not actually) make the size of the pattern cell larger or smaller be adding equal amounts of space (e.g., white space) between each of the pattern cells placed along a side, thus an integer number of the patterns cells fit along the side. Generally, the selection from the above alternatives is usually dependent on the user's desires and the particular type of pattern cell being utilized.

Returning to FIG. 4A, coordinate points for all curves within the pattern cell are then identified 68. In this second embodiment of the invention, it is assumed that the graphical placement technique 58 forms part of a drawing application program and that the drawing application program preferably uses curves to define the graphics of the drawing. Hence, the pattern cell is formed of curves and attributes associated with the curves. As examples, the drawing application programs known as Adobe illustrator® by Abode Systems, Inc., Freehand™ by Macromedia, Inc. and Canvas™ by Deneba Systems, Inc. follow these assumptions.

Next, a side of the path is selected 70. Then, the pattern cell is placed 72 on the selected side by transforming each curve within the pattern cell to the path. The transforming of the curves operates to transform the coordinate points for the curves within the pattern cell. Additional details on the placement 72 of the pattern cell along the path are discussed in detail below with respect to FIG. 5.

Next, a decision 74 is made based on whether there are more pattern cells to be placed on the selected side. If there are more pattern cells to be placed on the selected side, then processing returns to repeat block 72 and subsequent blocks. On the other hand, when the decision block 74 determines that there are no more pattern cells to be placed on the selected side, then a decision 76 determines whether there are additional sides to be processed. If there are additional sides to be processed, another side is selected 78 for processing. Following block 78, the graphical pattern placement technique 58 returns to repeat block 72 and subsequent blocks.

On the other hand, when the decision block 76 determines that there are no additional sides to be processed, a corner within the path is selected 80. A decision 82 then determines whether the pattern cell needs to be manipulated for the selected corner. If the pattern cell does need to be manipulated for the corner, then the pattern cell for the corner is manipulated 84. Namely, the pattern cell for the corner is shrunk, stretched, or bent by the manipulation. The manipulation may also require rotation of the pattern cell to fit the corner. Additional details on the manipulation of the pattern cell to fit the corner are described below with reference to FIGS. 6A–6C. Following block 84 when the pattern cell does need to be manipulated for the corner or following the decision block 82 when the pattern cell does not need to be manipulated for the corner, the pattern cell is placed 86 at the corner. Here, the pattern cell (after manipulation, if any) is placed 86 at the corner by transforming each curve within the pattern cell (after manipulation, if any) to the path. The transforming of the curves within the pattern cell operates to transform the coordinate points for the curves to the path.

Next, a decision 88 determines whether there are additional corners to process. When there are additional corners to be processed, another corner is selected 90. Following block 90, the graphical pattern placement technique 58 returns to repeat block 82 and subsequent blocks. On the other hand, when the decision block 88 determines that there are no additional corners to be processed, the graphical pattern placement technique 58 is complete and ends.

Figure 5:
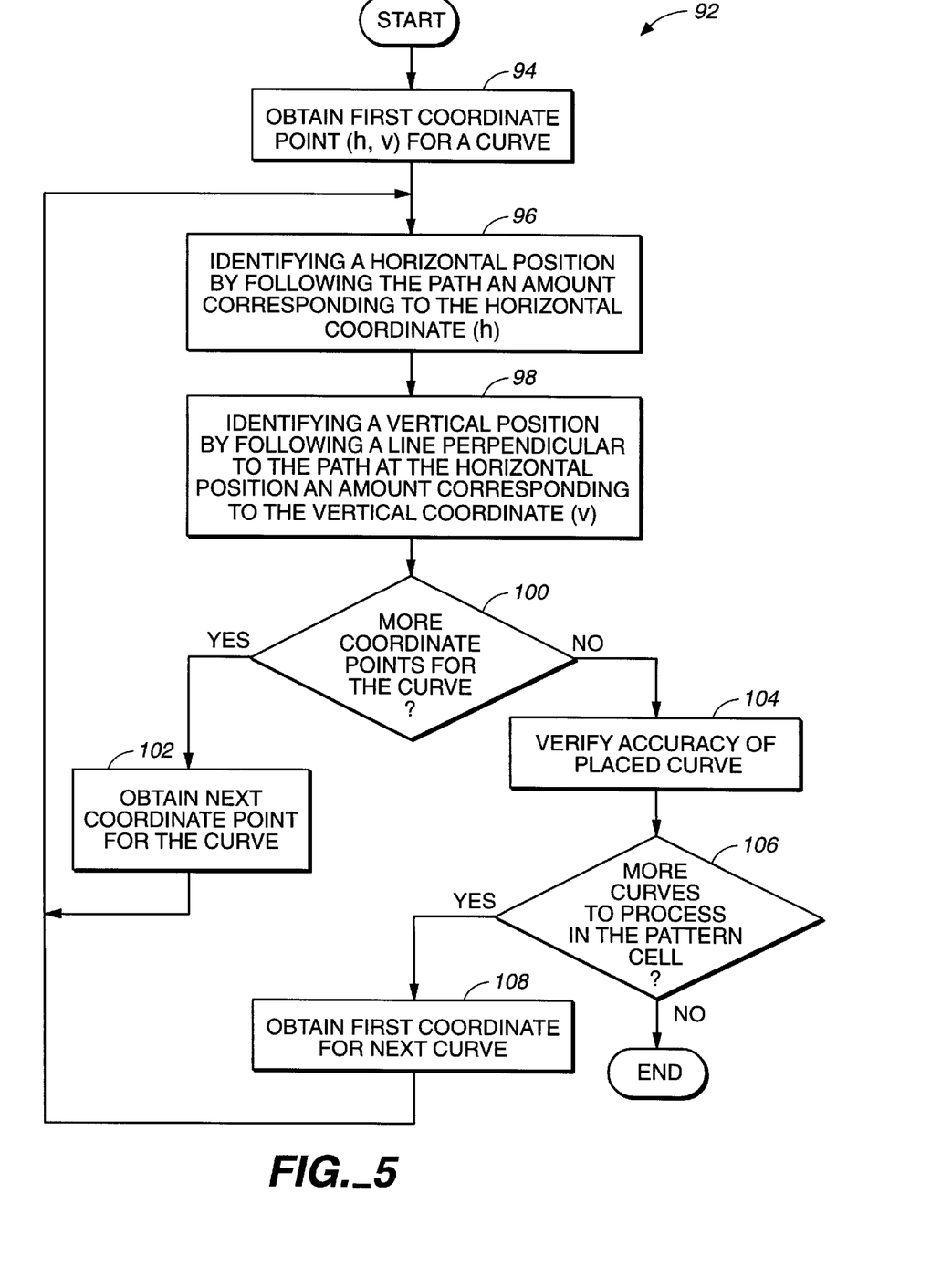
FIG. 5 is a flow diagram of pattern cell placement processing according to an embodiment of the invention.

FIG. 5 is a flow diagram of pattern cell placement processing 92 according to an embodiment of the invention. The pattern cell placement processing 92 corresponds to the operations performed by block 72 in FIG. 4A.

The pattern cell placement processing 92 obtains 94 a first coordinate point (h, v) for a curve within the pattern cell. Next, a horizontal position for the first coordinate point is identified 96 by following the path an amount corresponding to the horizontal coordinate (h) relative to the location of the start of the pattern on the path. Then, a vertical position for the first coordinate point is identified 98 by following a line perpendicular to the path at the horizontal position an amount corresponding to the vertical coordinate (v). As a result of the identifying operations 96 and 98, the pattern cell placement processing 92 effectively transforms the first coordinate point for a curve of the graphical pattern cell to the path (for a single instance of the pattern cell).

Next, a decision 100 determines whether there are more coordinate points for the curve to be placed. If there are more coordinate points for the curve to be placed, the next coordinate point for the curve is obtained 102. Following block 102, the pattern cell placement processing 92 returns to repeat block 96 and subsequent blocks. On the other hand, when the decision block 100 determines that there are no more coordinate points for the curve to be placed, the accuracy of the placed curve is verified 104.

The verification of the accuracy is needed to insure that the transforming of the coordinate points has not lead to inaccuracies. Hence, the transformed line produced by the transformed coordinate points is compared against a line that would be produced by piecewise transforming small linear segments of the curve. Preferably, the verification 104 of the accuracy of the placed curve is achieved by selecting a few points along the curve and transforming these points to the path in a similar manner as were the coordinate points. The positional difference between these placed points and the transformed curve are determined. Then, an evaluation of the accuracy of the placed curve is determined based on these positional differences. If the positional differences exceed a threshold amount, then it is determined that the accuracy of the placed curve is insufficient. Preferably, when the accuracy is insufficient, the placed curve is divided in half (into two curves) and the placement processing is reperformed for the first of the curves. Then, when the block 104 again determines whether the accuracy of the placed curve is sufficient. If the accuracy is still not sufficient, the curve would again be divided into two curves. This reiterative processing would continue up to certain maximum amount of times wherein the placement processing would decide to give up on obtaining sufficient accuracy.

Next, a decision 106 determines whether there are more curves to process in the pattern cell. If there are more curves to be processed in the pattern cell, the first coordinate for the next curve is obtained 108 and then processing returns to repeat block 96 and subsequent blocks. On the other hand, when there are no more curves to be processed in the pattern cell, the decision block 106 causes the pattern cell placement processing 92 to complete and end.

Generally speaking, the placement of the pattern cells along a side of a path requires that the pattern cell be bent (i.e., stretched and/or shrunk) in accordance with the curvature of the path at the position where the pattern cell is to be placed. In addition, the pattern cell may also need to be rotated to the proper orientation with the path, namely when the design of the pattern cell is not completely symmetric. The placement of the pattern cells by transforming the curves is the preferred technique when the patterns are defined by curves. However, those in the art should recognize that other techniques for bending and rotating the pattern cell may be used.

Figure 10A:
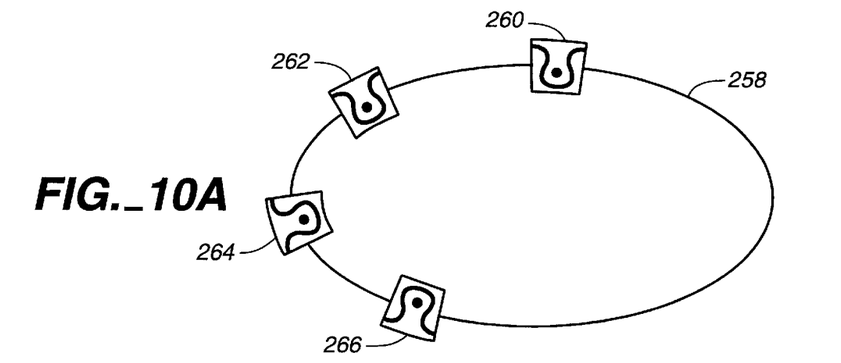
Figure 10B:
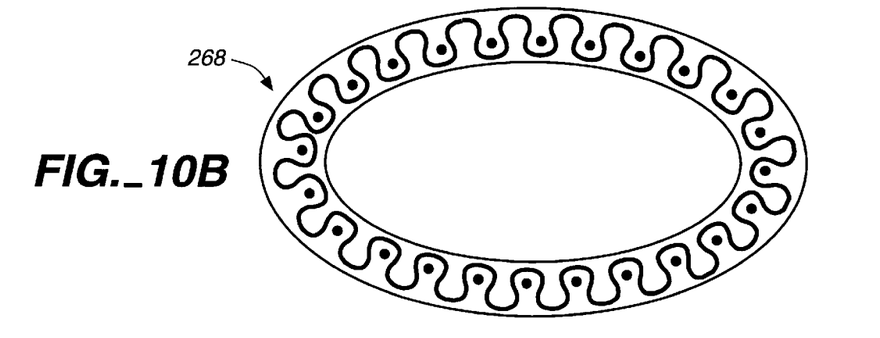

FIGS. 10A and 10B illustrate an example of the placement of the pattern cell around an elliptical path 258. In FIG. 10A, representative placed pattern cells 260, 262, 264 and 266 are illustrated. Notice that each of the placed pattern cells 260, 262, 264 and 266 is rotated such that the pattern cell is properly rotated. In this example, the rotation is such that the bottom side of the original pattern cell 200 (FIG. 7) faces the inside of the path 258. Also notice that each of the placed pattern cells 260, 262, 264 and 266 is bent in accordance with the curvature of the path 258 at the position where the pattern cell is to be placed. Here, comparing the original pattern cell 200 (FIG. 7) with the placed pattern cells 260, 262, 264 and 266 indicates that (i) the bottom side of the original pattern cell 200 has been shrunk, (ii) the top side has been stretched, and (iii) the placed pattern cells have the curvature of the path 258. FIG. 10B illustrates a pattern 268 eventually formed after all the pattern cells have been automatically placed.

Figure 6A:
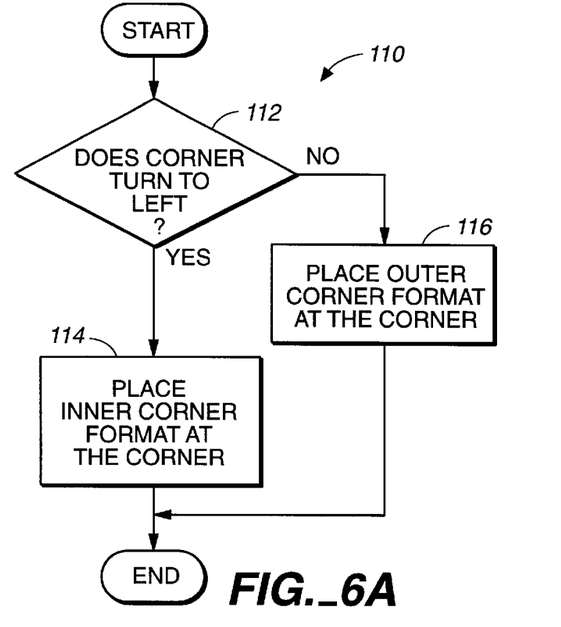
FIG. 6A–6C are flow diagrams of corner pattern cell placement processing according to an embodiment of the invention.

FIG. 6A is a flow diagram of corner placement processing 110 according to an embodiment of an invention. The corner placement processing 110 begins with a decision 112 that determines whether the corner turns to the left. If the corner turns to the left, the inner corner format 202 (FIG. 7) is placed 114 at the corner. On the other hand, if the corner is determined not to turn to the left (but instead to turn to the right), then the outer corner format 204 (FIG. 7) is placed 116 at the corner. For example, for the exemplary path 208 shown in FIG. 8, starting at the left most portion of the path 208, the first corner 226 is a turn to the left, the second corner 228 is a turn to the right, and the third corner 230 is a turn to the right. Following either of blocks 114 or 116, the corner placement processing 110 is complete for the corner. If additional comers are present in the path, then the corner placement processing 110 is repeated for each of the corners.

Figure 6B:
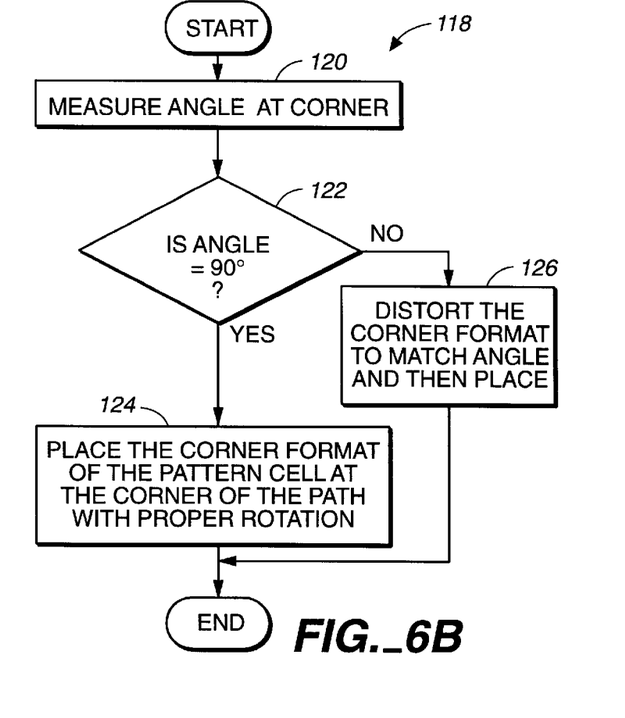

FIG. 6B is a flow diagram of corner manipulation processing 118 according to an embodiment of the invention. When placing the appropriate corner format of the pattern cell at a corner as shown in blocks 114 and 116 of FIG. 6A, the corner manipulation processing 118 is invoked.

The corner manipulation processing 118 first measures 120 the angle of the path at the corner. Then, a decision 122 determines whether the angle measured is equal to 90°. If the angle is equal to 90° (i.e., a square corner), the corner format of the pattern cell is placed 124 at the corner of the path with the proper rotation. Here, since the corner is square, the corner format previously selected (FIG. 6A) is simply placed at the corner after having been rotated for the orientation of the corner. The placement of the corner format of the pattern cell at the corner is preferably performed in the same manner discussed above in which the pattern cells were placed along the sides of the path.

On the other hand, if the angle is determined not to be equal to 90°, then the corner format of the pattern cell is distorted 126 to match the angle of the path at the corner, and then placed at the corner. The distortion of the corner format operates to distort the corner format to fit the corner of the path in a graphically pleasing manner.

Figure 6C:
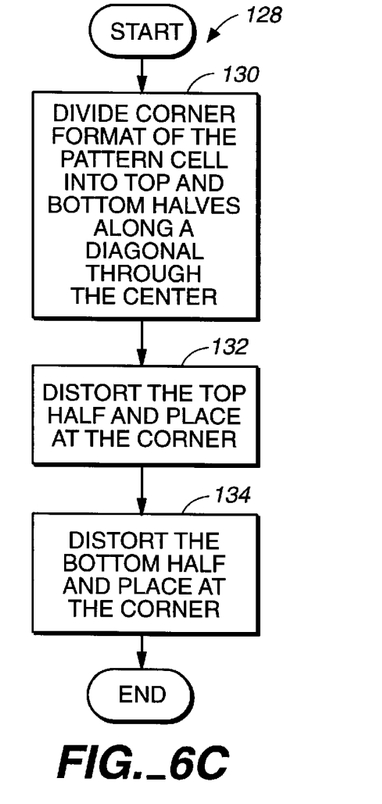

FIG. 6C is a flow diagram of distortion processing 128 for the corner format according to an embodiment of the invention. The distortion processing 128 is preferably the processing carried out by block 126 in FIG. 6B.

The distortion processing 128 initially divides 130 the corner format of the pattern cell into top and bottom halves along a diagonal through the center of the appropriate corner format of the pattern cell. Next, the top half is distorted 132 and placed at the corner. Then, the bottom half is distorted 134 and placed at the corner. Following block 134, the distortion processing 128 is complete and ends. The distortion processing 128 is further explained with examples illustrated in FIGS. 11A, 11B, 12A and 12B.

Figure 11A:
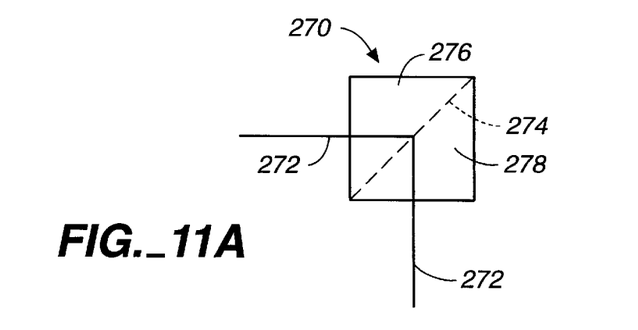
FIGS. 11A and 11B are diagrams illustrating distortion of a corner pattern cell to fit a corner of a path.

FIG. 11A illustrates an example of the division 130 of a corner pattern cell 270 to be placed at a corner of a path 272. The corner pattern cell 270 shows only the cell boundaries, not the pattern itself. The pattern within the cell boundaries can be any pattern. In this example, the corner pattern cell 270 is divided in half by a diagonal 274 to form a top half 276 and a bottom half 278.

Figure 11B:
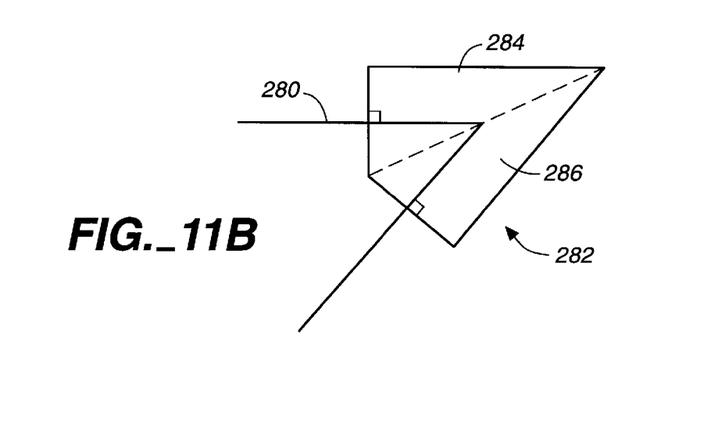

FIG. 11B illustrates an example of the distortion 132 of the corner pattern cell. When placing the carrier pattern cell 270 shown in FIG. 11A to a path 280 having a corner with an angle less than 90°, the corner pattern cell 270 is distorted to the corner pattern cell 282 shown in FIG. 11B. Note that both a top half 284 and a bottom half 286 of the corner pattern cell 282 are distorted 132, 134 so as to fit the corner of the path 280.

Figure 12A:
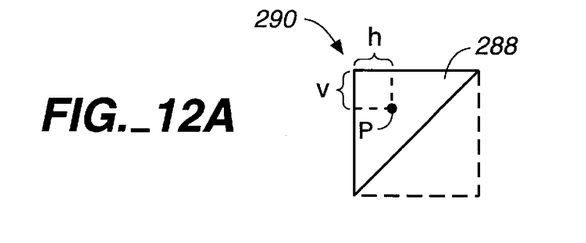
FIGS. 12A and 12B are diagrams illustrating distortion of a particular coordinate point of a top half of a corner pattern cell.
Figure 12B:
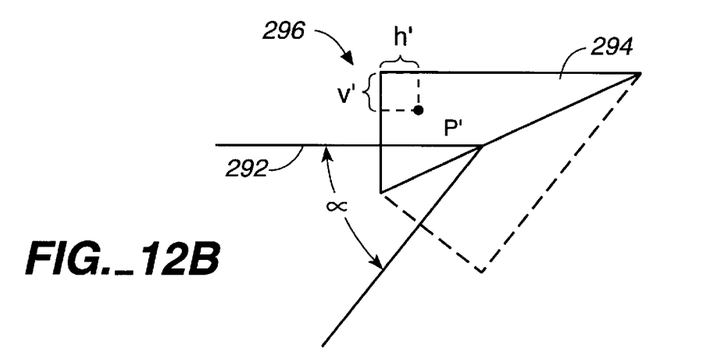

FIGS. 12A and 12B illustrates an example of the distortion 132 a top half 288 of a corner pattern cell 290. Here, the corner pattern cell 290 is to be placed at a corner of a path 292. However, since the angle of the corner is less than 90°, the corner pattern cell 290 must be distorted 132 to fit the corner. The distortion 132 in this example produces a distorted top half 294 of a distorted pattern cell 296. In particular, the distorted top half 294 is produced by effectively mitering the top half 288 of the corner pattern cell 290. In other words, for a given corner, the distorted pattern cell 296 is formed from the corner pattern cell 290.

Preferably, as shown in FIGS. 12A and 12B, the distortion 132 alters each coordinate point P (h, v) within the corner cell pattern 290 to a distorted coordinate point P' (h', v') within the distorted cell pattern 296. For the top half 294, the h, v coordinates are measured with respect to the upper left corner of the top half 294 (or, for the bottom half, the lower right corner of the bottom half). The distortion technique determines h', v' given h, v and corner angle $\alpha$:

$h' = h / \tan(\alpha/2)$ $v' = v$

The distortion 132 in this example makes the distorted top half 294 into a "wedge" shape out of a triangle shape of the top half 288 so as to fill the corner with a correctly mitered corner cell pattern. The distortion 134 similarly produces the distorted bottom half.

Figure 13A:
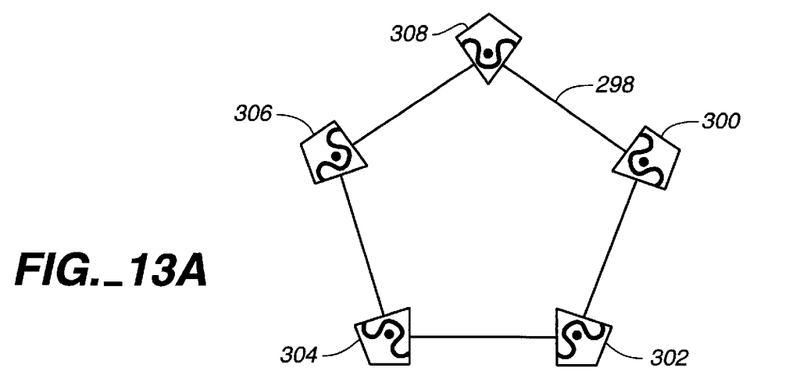
FIGS. 13A and 13B are examples of corner pattern cells, paths and patterns produced by the invention.
Figure 13B:
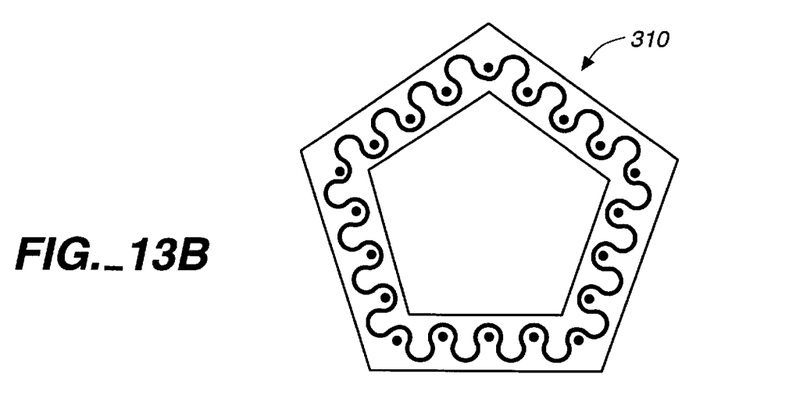

FIGS. 13A and 13B illustrate an example of the placement of the pattern cell at corners of a pentagonal path 298. In FIG. 13A, the five corner pattern cells 300, 302, 304, 306 and 308 on the pentagonal path 298 are individually distorted using the technique discussed above in detail with respect to FIGS. 12A and 12B. Once the sides and corners are automatically placed on the path 298, a pattern 310 as illustrated in FIG. 13B is formed. Notice that the pattern cells placed at the corners blend properly with the pattern cells placed at the sides.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer-implemented method for placing a graphical pattern around a path, comprising:
    (a) providing a path along a single plane on an electronic document;
    (b) selecting a graphical pattern; and
    (c) automatically and repetitively placing instances of the graphical pattern edge-to-edge in alignment in the graphical pattern edge-to-edge in alignment in the single plane along the path.

2. A method as recited in claim 1, wherein the placing step (c) comprises:
    (c1) identifying coordinate points for the curves within the graphical pattern; and
    (c2) transforming the curves within the graphical pattern to the path using the coordinate points for the curve.

3. A method as recited in claim 2, wherein the transforming step (c2) operates to bend each of the curves as needed to follow the path.

4. A method as recited in claim 3, wherein the transforming step (c2) comprises:
    positioning the coordinate points of the curves within the graphical pattern to the path by measuring in a horizontal distance along the path to a first point and then measuring in a vertical distance along a line perpendicular to the path at the first point to a second point, the second point being a transformed coordinate point.

5. A method as recited in claim 3, wherein the graphical pattern has an initial size and the path has an initial size, and
    wherein said placing step (c) comprises altering the initial size of at least one of the path and the graphical pattern so that multiple instances of the graphical pattern exactly fit along the path.

6. A method as recited in claim 1, wherein the placing step (c) comprises: adjusting the size of the graphical pattern and/or the path so that a multiple number of pattern cells exactly fit along a portion of the path.

7. A method as recited in claim 6, wherein the path includes sides and corners, and
    wherein the portion of the path is a side of the path.

8. A method as recited in claim 6,
    wherein the path has an orientation and a curvature at each position along the path, and wherein the method further comprises:
    (d) modifying, prior to the placing step (c), the graphical pattern for each instance to be placed to the orientation and curvature of a position along the path where the instance is to be placed.

9. A method as recited in claim 8, wherein the modifying step (d) operates to rotate the graphical pattern to the orientation of the position along the path where instance of the graphical pattern is to be placed, and to bend the graphical pattern to the curvature of the position along the path where the instance of the graphical pattern is to be placed.

10. A method as recited in claim 1, wherein the electronic document is an image document.

11. A method as recited in claim 10, wherein the electronic image document and the path thereon are created by a computer-operated drawing program.

12. The computer-implemented method of claim 1 wherein each instance of the graphical pattern is pictorially related to its adjacent instances along the path.

13. A computer-implemented method for forming a graphical image in an electronic document using a graphical pattern, said method comprising:
    (a) providing a path lying in a single plane on the electronic document;
    (b) dividing the path into corner regions and side regions;
    (c) adjusting the size of at least one instance of the graphical pattern and the path for each of the side regions so that an integral number of graphical patterns exactly fit along each of the side regions;
    (d) modifying the shape of an instance of the graphical pattern to fit the corner regions of the path; and
    (e) placing the adjusted and modified graphical patterns edge-to-edge in the single plane in alignment along the path.

14. A method as recited in claim 13, wherein the placing step (e) comprises:
    (e1) identifying coordinate points for all curves within the graphical pattern; and
    (e2) transforming each of the curves within the graphical pattern to the path using the coordinate points for the curve identified in (e1).

15. A method as recited in claim 14, wherein the transforming step (e2) operates to bend each of the curves as needed to follow the path.

16. A method as recited in claim 13,
    wherein the path has an orientation and a curvature at each point along the path, and
    wherein said method further comprises the step (f) of modifying, prior to the placing step (e), the instance of the graphical pattern to fit the orientation and curvature of a position along the path where the graphical pattern is to be placed.

17. A method as recited in claim 16, wherein the modifying step (f) operates to rotate the instance of the graphical pattern to the orientation of the position along the path where the graphical pattern is to be placed, and to bend the graphical pattern to the curvature of the position along the path where the graphical pattern is to be placed.

18. A method as recited in claim 13,
    wherein the path has an orientation, a curvature and an angle at each of the corner regions along the path, and
    wherein the modifying step (d) operates to rotate the instance of the graphical pattern to the orientation of the corner region where the instance of the graphical pattern is to be placed, and to bend the graphical pattern to the curvature and the angle of the corner region where the graphical pattern is to be placed.

19. A method as recited in claim 18, wherein the bending of the instance of the graphical pattern to the curvature and the angle of the corner region operates to distort the graphical pattern to fit the corner region.

20. A method as recited in claim 19,
wherein a predetermined corner format of the instance of the graphical pattern is placed at each of the corner regions after being distorted to fit the particular corner region, and
wherein the distortion of the predetermined corner format includes dividing the predetermined corner format in half using a diagonal through the center of the predetermined corner format, and then distorting each of the resulting halves.

21. The computer-implemented method of claim 13 wherein each instance of the graphical pattern is pictorially related to its adjacent instances along the path.

22. A computer readable medium containing program instructions for placing a graphical pattern along a path on an electronic document, said computer readable medium comprising:
computer readable code devices for providing a path lying in a single plane on an electronic document;
computer readable code devices for selecting a graphical pattern; and
computer readable code devices for automatically and repetitively placing instances of the graphical pattern edge-to-edge in the single plane in alignment along the path.

23. A computer readable medium as recited in claim 22, wherein said computer code devices for placing comprise:
computer readable code devices for identifying coordinate points for the curves within the graphical pattern; and
computer readable code devices for transforming the curves within the graphical pattern to the path using the coordinate points for the curve.

24. A computer readable medium as recited in claim 23, wherein the computer readable code devices for transforming operates to bend the curves as needed to follow the path.

25. A computer readable medium as recited in claim 24, wherein the computer readable code devices for transforming comprise:
computer readable code devices for positioning the coordinate points for the curves within the graphical pattern to the path by measuring in a horizontal distance along the path to a first point and then measuring in a vertical distance along a line perpendicular to the path at the first point to a second point, the second point being a transformed coordinate point.

26. A computer readable medium as recited in claim 24, wherein the graphical pattern has an initial size and the path has an initial size, and
wherein the computer code devices for placing further comprise:
computer readable code devices for altering the initial size of at least one of the path and the graphical pattern so that multiple instances of the graphical pattern exactly fit along the path.

27. A computer readable medium as recited in claim 22, wherein the computer code devices for placing comprise:
computer readable code devices for adjusting the size of the graphical pattern and/or the path so that a multiple number of pattern cells exactly fit along a portion of the path.

28. A computer readable medium as recited in claim 27, wherein the path has an orientation and a curvature at the position along the path, and
wherein said computer readable medium further comprises:
computer code devices for modifying the graphical pattern for the instances of the graphical pattern to the orientation and curvature of a position along the path where the respective instance is to be placed.

29. A computer readable medium as recited in claim 28, wherein the computer code devices for modifying operate to rotate the instance of the graphical pattern to the orientation of the position along the path where the graphical pattern is to be placed, and to bend the graphical pattern to the curvature of the position along the path where the graphical pattern is to be placed.

30. The computer-implemented method of claim 22 wherein each instance of the graphical pattern is pictorially related to its adjacent instances along the path.

* * * * *

UNITED STATES PATENT AND TRADEMARK OFFICE
CERTIFICATE OF CORRECTION

PATENT NO. : 5,831,632
DATED : November 3, 1998
INVENTOR(S) : Michael D. Schuster and John E. Warnock It is certified that error appears in the above-identified patent and that said Letters Patent is hereby corrected as shown below:

Column 11,
Line 33, delete "graphical pattern edge-to-edge in alignment in the".

Signed and Sealed this

Twelfth Day of October, 2004

JON W. DUDAS
*Director of the United States Patent and Trademark Office*